(12) United States Patent
Gogoi et al.

(10) Patent No.: US 7,690,255 B2
(45) Date of Patent: Apr. 6, 2010

(54) THREE-AXIS INERTIAL SENSOR AND METHOD OF FORMING

(75) Inventors: Bishnu Prasanna Gogoi, Scottsdale, AZ (US); Navid Yazdi, Ann Arbor, MI (US)

(73) Assignee: Evigia Systems, Inc., Ann Arbor, MI (US)

( * ) Notice: Subject to any disclaimer, the term of this patent is extended or adjusted under 35 U.S.C. 154(b) by 385 days.

(21) Appl. No.: 11/848,301

(22) Filed: Aug. 31, 2007

(65) Prior Publication Data
US 2008/0053229 A1  Mar. 6, 2008

Related U.S. Application Data

(60) Provisional application No. 60/841,429, filed on Aug. 31, 2006.

(51) Int. Cl.
*G01P 15/125* (2006.01)
*H01L 21/00* (2006.01)

(52) U.S. Cl. ..................... 73/514.32; 438/50
(58) Field of Classification Search .............. 73/514.32; 438/50
See application file for complete search history.

(56) References Cited

U.S. PATENT DOCUMENTS

| | | | | |
|---|---|---|---|---|
| 6,060,336 A | * | 5/2000 | Wan | ........................... 438/50 |
| 7,238,999 B2 | * | 7/2007 | LaFond et al. | ........... 73/514.02 |

* cited by examiner

*Primary Examiner*—John E Chapman
(74) *Attorney, Agent, or Firm*—Hartman & Hartman, P.C; Gary M. Hartman; Domenica N. S. Hartman

(57) ABSTRACT

A three-axis inertial sensor and a process for its fabrication using an silicon-on-oxide (SOI) wafer as a starting material. The SOI wafer has a first conductive layer separated from a second conductive layer by an insulative buried oxide (BOX) layer. The SOI wafer is fabricated to partially define in its first conductive layer at least portions of proof masses for z, x, and y-axis sensing devices of the sensor. After a conductive deposited layer is deposited and patterned to form a suspension spring for the proof mass of the z-axis sensing device, the SOI wafer is bonded to a substrate that preferably carries interface circuitry for the z, x, and y-axis devices, with the SOI wafer being oriented so that its first conductive layer faces the substrate. Portions of the BOX layer are then etched to fully release the proof masses.

24 Claims, 5 Drawing Sheets

THREE-AXIS INERTIAL SENSOR AND METHOD OF FORMING

CROSS REFERENCE TO RELATED APPLICATIONS

This application claims the benefit of U.S. Provisional Application No. 60/841,429, filed Aug. 31, 2006, the contents of which are incorporated herein by reference.

BACKGROUND OF THE INVENTION

The present invention generally relates to motion sensing devices and their fabrication methods. More particularly, this invention relates to a three-axis inertial sensor and a process for its fabrication.

Three-axis inertial sensors that respond to inertial forces in the x, y and z axes are finding applications in the detection of shock, vibration, and acceleration. These sensors have been fabricated with MEMS (micro-electro-mechanical systems) technology using bulk micromachining, surface machining, or a combination of the two. Particular interest in capacitive three-axis accelerometers has existed in part because they are capable of low power consumption and high sensitivity. Such sensors use the displacement of a proof mass in response to input inertial forces (shock, vibration, and/or acceleration) to cause a change in the gap spacing of the proof mass relative to one or more fixed electrodes, thereby producing changes in capacitance between the proof mass and fixed electrodes. Changes in capacitance are detected and used as the input to an interface circuit that converts the capacitance to an electrical signal, such as voltage or frequency.

In the bulk micromachined implementation of a three-axis inertial sensor, the sensor is formed by patterning and etching a device wafer (formed of silicon or another semiconductor material) to define the sensor features including the proof mass, and then bonding the device wafer to another wafer (e.g., silicon or glass) that provides the fixed electrodes for the sensor. While exhibiting high sensitivity, such sensors are relatively large in size. The surface micromachined implementation of a three-axis inertial sensor typically uses deposited films (such as polysilicon) to form the sensor features. Since film thicknesses are typically limited, the sensors can be relatively small, though generally exhibiting lower sensitivity than bulk micromachined sensors due to a smaller proof mass.

Other implementations of three-axis inertial sensors include the use of SOI (silicon on insulator) wafers and epitaxially-deposited silicon (epipoly). The resulting sensors are capable of exhibiting high sensitivity in the x and y axes, though generally significantly lower sensitivity in the z-axis.

In view of the above, there is a need for three-axis inertial sensors capable of exhibiting high sensitivities in the x-axis, y-axis, and z-axis in a small die size, using a structure and fabrication process that is simple and capable of high yields.

BRIEF SUMMARY OF THE INVENTION

The present invention provides a three-axis inertial sensor and a process for its fabrication using an SOI wafer as a starting material. The inertial sensor is preferably capable of exhibiting high sensitivity in three axes (x, y, and z) in a small die size.

The inertial sensor of this invention is generally a MEMS device that senses motion in three axes by sensing the displacement of proof masses that respond to input inertial forces (shock, vibration, and/or acceleration) in a manner that causes changes in gaps between the proof masses and fixed electrodes associated therewith, thereby producing changes in capacitance. Changes in capacitance are detected and used as the input to an interface circuit that converts the capacitance to an electrical signal, such as voltage or frequency.

The process of this invention generally entails the use of an SOI wafer, which includes a first conductive (e.g., device) layer separated from a second conductive (e.g., handle) layer by an insulative buried oxide (BOX) layer. The SOI wafer is then fabricated to partially define in its first conductive layer at least portions of proof masses for the z, x, and y-axis sensing devices. After a conductive deposited layer is deposited and patterned to form a suspension spring for the proof mass of the z-axis sensing device, the SOI wafer is then bonded to a substrate that preferably carries interface circuitry for the z, x, and y-axis devices, with the SOI wafer being oriented so that its first conductive layer faces the substrate. Portions of the BOX layer are then etched to fully release the proof masses.

In view of the above, it can be seen that the three-axis inertial sensor of this invention can be formed using an SOI wafer and surface micromachining technology to form its features, including the proof masses. The SOI wafer is processed separately to define proof masses that are responsive in the x, y, and z axes, after which the SOI wafer is bonded to a substrate that preferably carries interface circuit (e.g., CMOS circuitry). The sensor can then be completed by performing the final process steps on the resulting wafer stack.

As indicated above, the SOI wafer comprises a first conductive (device) layer separated from a second conductive (handle) layer by an insulative buried oxide (BOX) layer. In particular and preferred embodiments of the invention, the proof mass of the z-axis inertial sensor is formed from the device layer, and a deposited (e.g., polysilicon) layer is used as the suspension spring to achieve a high sensitivity for the z-axis proof mass. The handle layer of the SOI wafer is used to form the fixed electrode for the z-axis proof mass by patterning the handle wafer to form an electrically isolated island. Vertical lead transfers connect the fixed electrode within the patterned handle layer to islands in the device layer. A fully differential device can be formed if the deposited layer is also used to form a fixed plate (electrode), so that the proof mass moves between the fixed plate formed by the deposited layer and the fixed plate patterned from the handle layer. Alternatively, a fixed plate can be formed on the substrate, with the gap between the proof mass and fixed plate being controlled by the spacing between the SOI wafer and the substrate. Leads are transferred from the z-axis inertial sensor to the second (e.g., CMOS) wafer to connect the z-axis sensor of the SOI wafer to the interface circuit on the substrate. The z-axis proof mass is released after the SOI wafer is bonded to the substrate.

Also in particular and preferred embodiments of the invention, the proof masses for the x-axis and y-axis inertial sensors are formed from the device and handle layers of the SOI wafer, and the device layer is etched to form suspension springs for the x and y-axis proof masses to achieve a high sensitivity. Leads are transferred from the x-axis and y-axis inertial sensors to the second (e.g., CMOS) wafer to connect the x-axis and-axis inertial sensors on the SOI wafer to the interface circuit on the substrate. The x-axis and y-axis proof masses are released after the SOI wafer is bonded to the substrate.

In view of the above, it can be seen that notable advantages made possible with the present invention include the formation of a z-axis inertial sensor whose proof mass is formed using the device layer of an SOI wafer, whose suspension spring is formed using a deposited layer, and whose fixed electrode(s) is formed using an electrically isolated island patterned from the handle layer. The x-axis and y-axis inertial sensors can be simultaneous formed whose proof masses are formed using the device layer and patterned handle layer, and whose suspension springs are formed using the device layer or a deposited layer. Lead transfers from the x-axis, y-axis and z-axis devices to the substrate are performed using a wafer-to-wafer bonding process, after which the fabrication of the x-axis, y-axis and z-axis inertial sensors is completed on the resulting wafer stack.

Other objects and advantages of this invention will be better appreciated from the following detailed description.

DETAILED DESCRIPTION OF THE INVENTION

Figure 1:
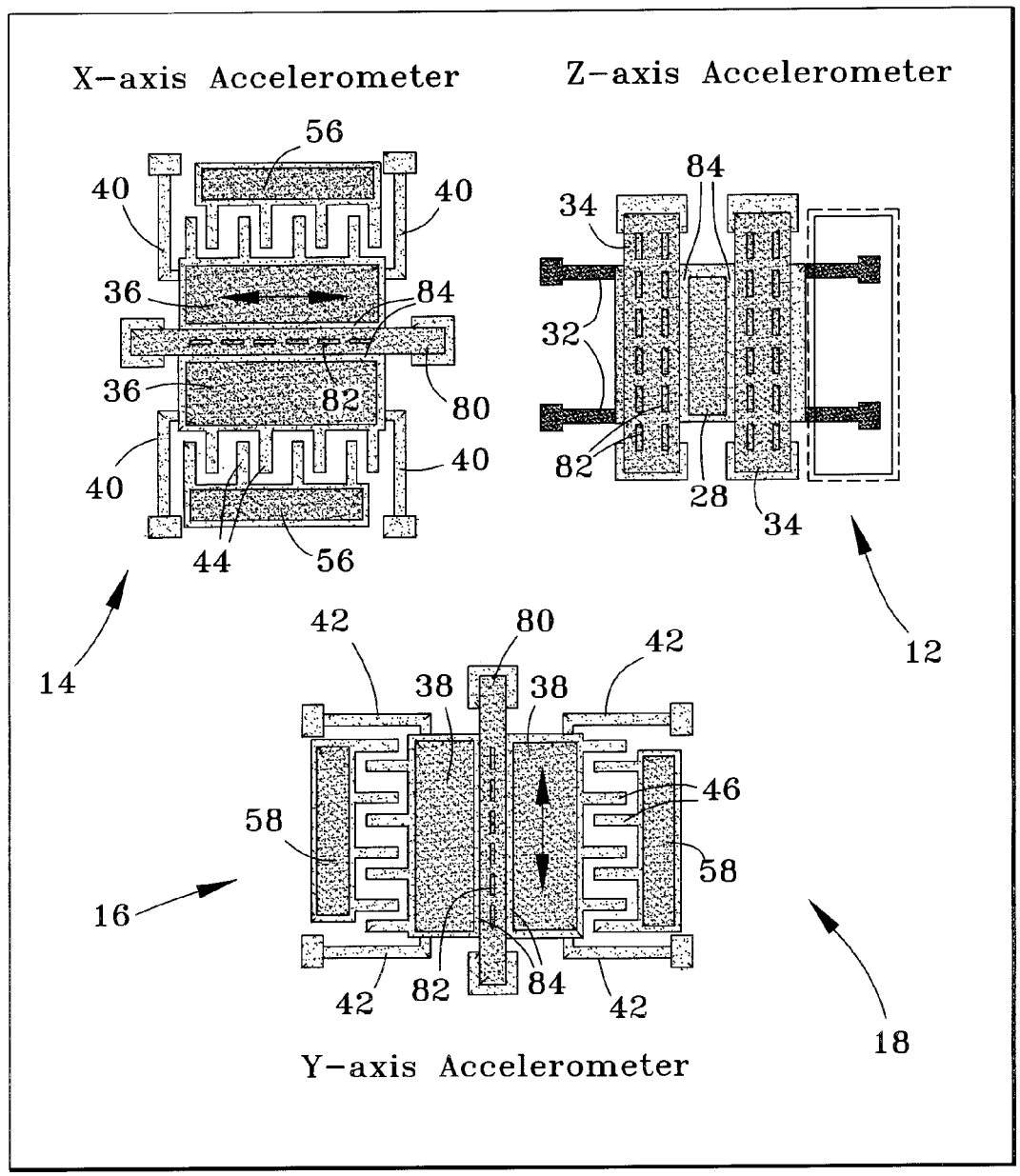
FIG. 1 is a plan view of a three-axis inertial sensor chip with x-axis, y-axis, and z-axis inertial sensing devices of types that can be fabricated in accordance with the present invention.
Figure 2:
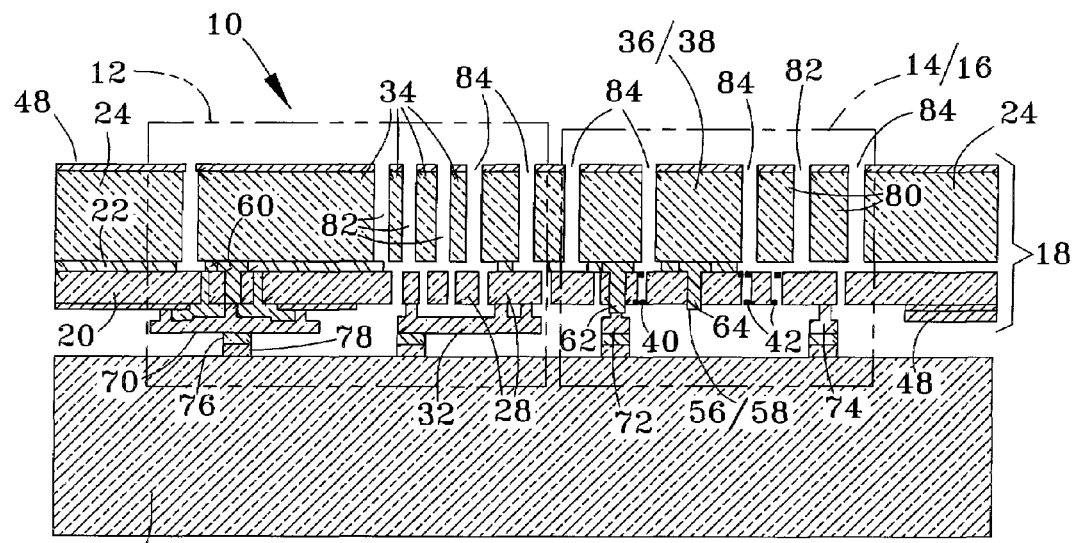
FIG. 2 is a cross-sectional view schematically representing different sections of a three-axis inertial sensor chip using an SOI wafer in accordance with this invention.
Figure 3A:
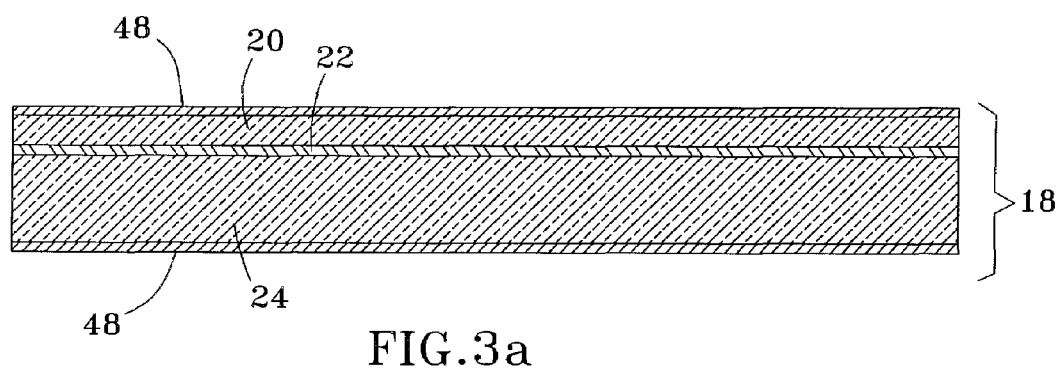
FIG. 3a through 3l are cross-sectional views representing a fabrication process for producing the three-axis inertial sensor of FIG. 1.
Figure 3B:
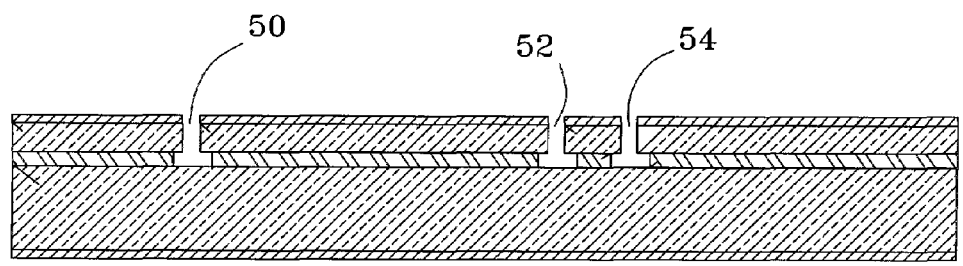
Figure 3C:
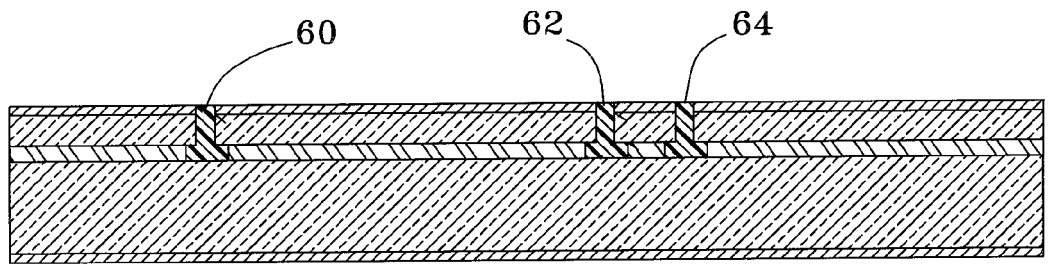
Figure 3D:
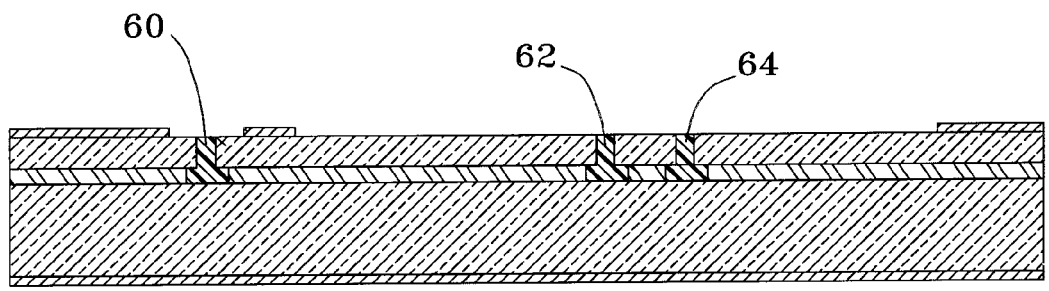
Figure 3E:
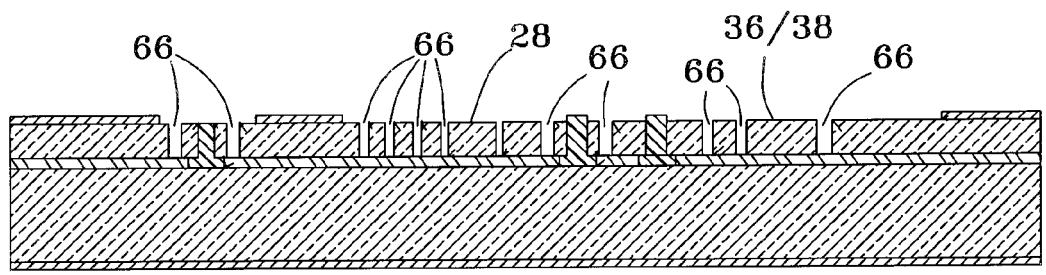
Figure 3F:
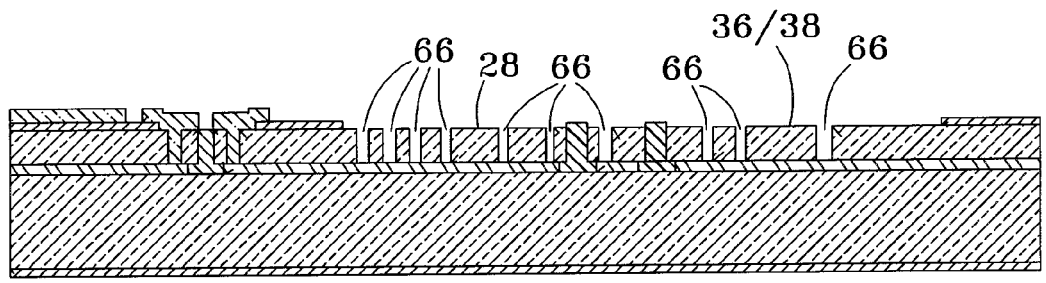
Figure 3G:
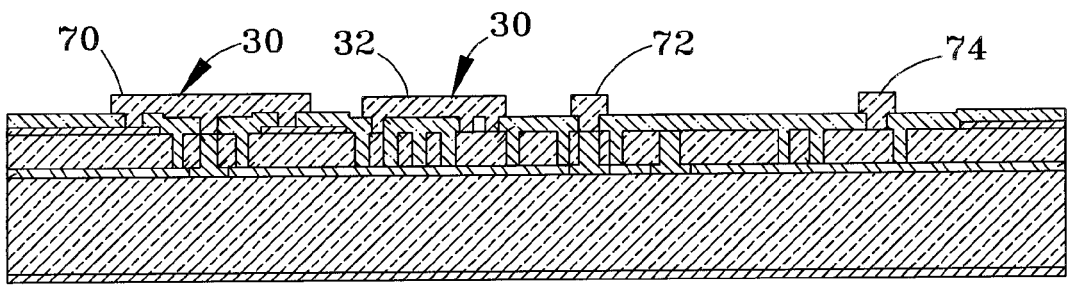
Figure 3H:
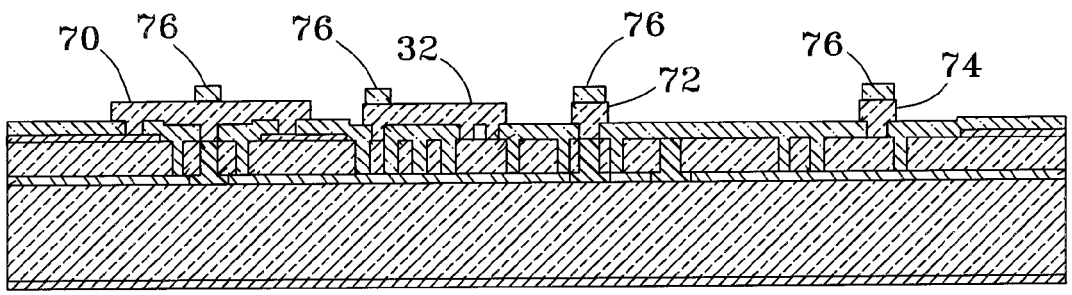
Figure 3I:
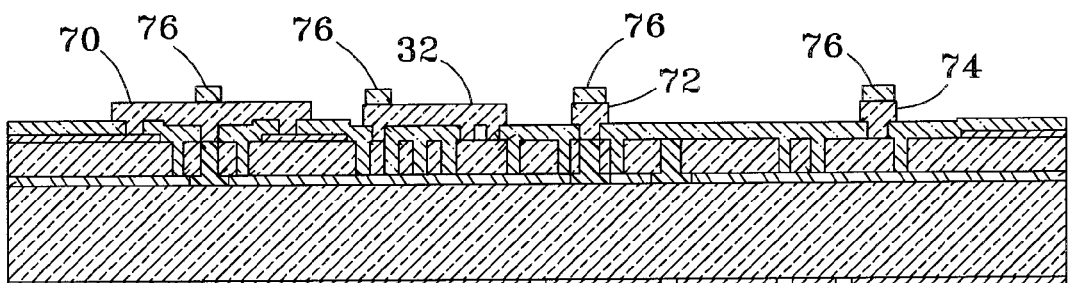
Figure 3J:
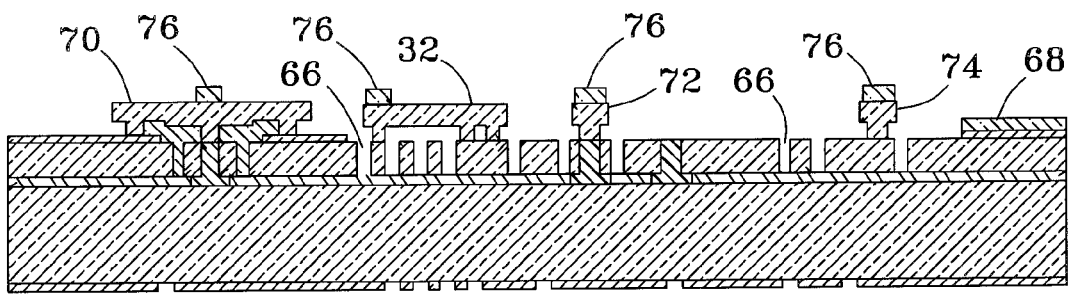
Figure 3K:
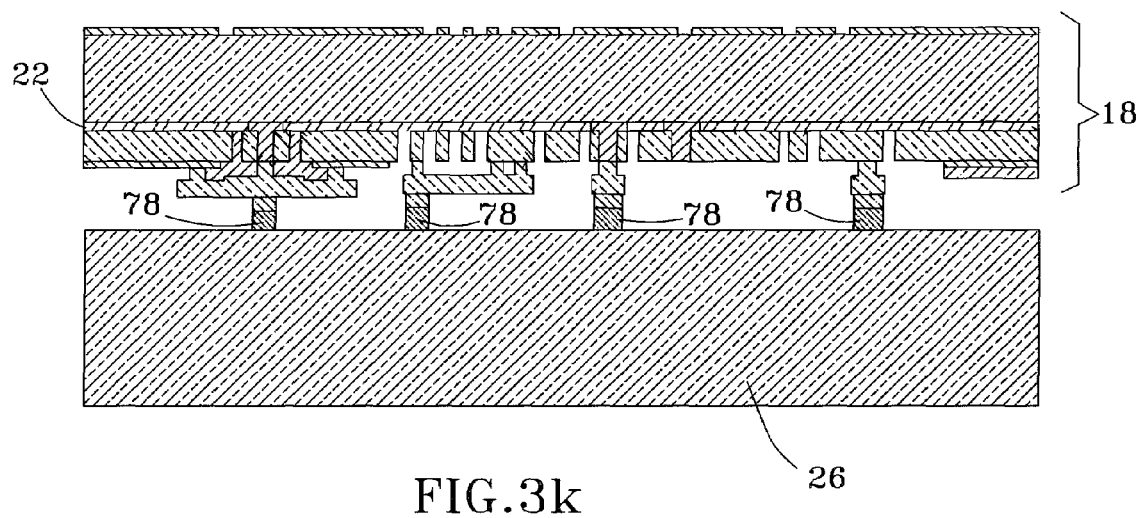
Figure 3L:
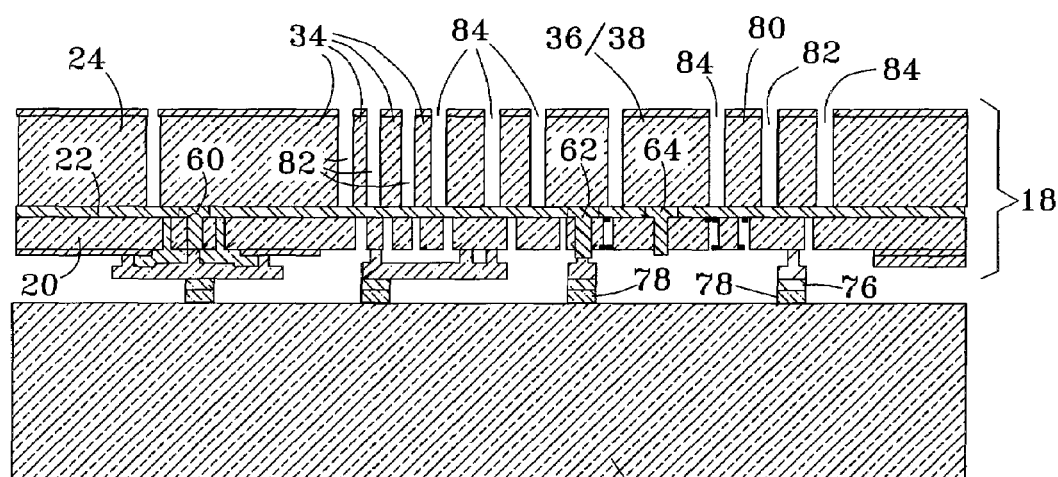

FIG. 1 schematically represents a plan view of a three-axis inertial sensor chip 10 containing z-axis, x-axis, and y-axis inertial sensing devices 12, 14 and 16, respectively, all of which are formed with the use of an SOI wafer (18 in FIGS. 2 and 3a through 3l) bonded to substrate 26 (FIGS. 2, 3k, and 3l). The substrate 26 may be formed of glass or a semiconductor material, but is preferably a silicon wafer fabricated to contain an integrated circuit, more preferably a silicon wafer with CMOS circuitry (hereinafter, a CMOS wafer 26). As is conventional, the SOI wafer 18 is shown in FIGS. 2 and 3a through 3l as including an electrically-conductive (e.g., doped silicon) device layer 20 separated from an electrically-conductive (e.g., doped silicon) handle layer 24 by an electrically-insulative buried oxide (BOX) layer 22. While the SOI wafer 18 is preferred, it will become evident to those skilled in the art that other materials and processes could be employed to fabricate a three-axis inertial sensor of the type represented in FIG. 1. It should be noted that the Figures are drawn for purposes of clarity when viewed in combination with the following description, and therefore are not necessarily to scale. It should also be noted that terms such as "upper," "lower," "topside," and "backside" are in reference to the orientation shown in the Figures, and are not limitations to the sensor chip 10 or its use.

As will be described below in reference to FIGS. 2 and 3a through 3l, the z-axis sensing device 12 is formed by using portions of the device and handle layers 20 and 24 of the SOI wafer 18 to form a proof mass 28 for the z-axis device 12, using a deposited (e.g., polysilicon) layer (30 in FIG. 3g) to form a suspension spring 32 for the proof mass 28, and an electrically isolated island of the handle layer 24 to form an upper fixed electrode 34 for the proof mass 28. The x-axis and y-axis sensing devices 14 and 16 are also formed using the device and handle layers 22 and 24 of the SOI wafer 18. Specific features of these devices are shown in FIG. 1 as including proof masses 36 and 38, suspension springs 40 and 42 for the proof masses 36 and 38, and electrically isolated islands of the handle layer 24 that form fixed electrodes 56 and 58 for the proof masses 36 and 38, and interdigitated fingers 44 and 46 that extend from the proof masses 36 and 38 and the electrodes 56 and 58. Inertial sensors with interdigitated fingers of the type shown in FIG. 1 are well known in the art, a particularly advanced example of which is disclosed in commonly-assigned U.S. patent application Ser. No. 11/458,729 to Yazdi. As evident from FIG. 1, the x and y-axis devices 14 and 16 can be similarly configuration yet adapted to sense movement in the x and y axes (transverse directions in the plane of the sensor chip 10) by orienting their response axes (indicated by double-headed arrows) transverse to each other.

For convenience, only portions of the devices 12, 14, and 16 are shown in the cross-sectional representation of FIG. 2. Such portions do not necessarily lie on the same axis with respect to FIG. 1, but are merged and displayed in a single cross-section in FIG. 2 for convenience. Portions pertaining to the processing and fabrication of the z-axis device 12 are labeled as 12 in FIG. 2, while portions pertaining to the processing and fabrication of the x and y-axis devices 14 and 16 are combined and labeled as 14/16 in FIG. 2. For each of the devices 14 and 16, their respective proof masses 36 and 38 and respective fixed electrodes 56 and 58 are shown in FIG. 2 as being formed by portions of the device, BOX, and handle layers 20, 22, and 24 of the SOI wafer 18, and portions of the device layer 20 are used to form their respective interdigitated fingers 44 and 46 and suspension springs 40 and 42.

A detailed fabrication process is described in FIG. 3a through 3l for the sensor chip 10 and its devices 12, 14, and 16 represented in FIG. 1. Again for convenience, the process is represented in FIGS. 3a through 3l to coincide with the partial representation of the sensing devices 12, 14, and 16 in FIG. 2.

FIG. 3a shows an initial processing step in which the SOI wafer 18 has been provided with a protective layer 48, such as silicon nitride, that is been conformally deposited over the SOI wafer 18. The protective layer 48 will be used as a mask and etch stop layer for subsequent processes, and those skilled in the art will be aware of suitable thicknesses for the protective layer 48 for this purpose. FIG. 3b shows the SOI wafer 18 after the completion of further processing steps, during which the protective layer 48 has been patterned and etched to form an etch mask, the device layer 20 of the SOI wafer 18 has been etched through this mask, such as with a DRIE (deep reactive ion etching) process, to form trenches 50, 52, and 54, and the buried oxide layer 22 of the SOI wafer 18 has been subsequently removed, such as by using a wet etchant, for example, buffered hydrofluoric acid. At the completion of these steps, regions of the handle layer 24 are exposed by the trenches 50, 52 and 54 so that electrical contact can be subsequently made to the handle layer 24. The trenches 50, 52 and 54 can have an desired shape, for example, square, rectangular, round, etc.

In FIG. 3c, the trenches 50, 52 and 54 in the SOI wafer 18 have been filled with a conformal conductive film, such as LPCVD (low pressure chemical vapor deposition) polysilicon, to form contacts 60, 62 and 64 that extend through the device and BOX layers 20 and 22 and contact the handle layer 24, thereby providing electrical contact between the device and handle layers 20 and 24 of the SOI wafer 18. In-situ doped polysilicon may also be used to form the contacts 60, 62 and 64. FIG. 3c shows the appearance of the SOI wafer 18 after the excess polysilicon deposited on the topside and backside of the wafer 18 has been removed, such as with a blanket etch process.

FIG. 3d represents the appearance of the SOI wafer 18 after the protective layer 48 on the topside of the wafer 18 has been patterned and etched to act as the etch mask for the subsequent process step. FIG. 3e shows the SOI wafer 18 following etching of the device layer 20 on the topside using a DRIE process to form trenches 66, resulting in regions of the BOX layer 22 being exposed at the bottom of the trenches 66. The trenches 66 are represented in FIG. 3d as defining within the device layer 20 portions of the proof masses 28, 36, and 38 of the z, x, and y-axis devices 12,14, and 16, respectively, as well as the suspension springs 40 and 42 and interdigitated fingers 44 and 46 of the x-axis and y-axis devices 14 and 16. Though not indicated in FIG. 1, the trenches 66 can also be used to define the fixed electrodes 34, 56, and 58, as represented in FIG. 3d.

FIG. 3f shows the SOI wafer 18 at a subsequent state of processing where the trenches 66 etched in the previous step have been filled with a refill layer 68 that closes the trenches 66 at the surface of the device layer 20. FIG. 3f further shows the refill layer 68 after being patterned and etched to open contacts to different parts of the x, y, and z-axis devices 12, 14, and 16. A preferred material for the refill layer 68 is believed to be tetra ethyl orthosilicate (TEOS) deposited by LPCVD, though other LPCVD-deposited materials could be used including low temperature oxide (LTO), high temperature oxide (HTO), phosphosilicate glass (PSG), borosilicate glass (BSG), and borophosphosilicate glass (BPSG). Another option is to form the refill layer 68 of TEOS, PSG, BSG, or BPSG deposited by plasma enhanced chemical vapor deposition (PECVD), followed by a reflow process. Spin-on glasses of various compositions may also be used to refill the trenches 66, as can combinations of films.

FIG. 3g shows the SOI wafer 18 after the deposition and patterning of the aforementioned polysilicon layer 30 that forms structural parts of the x, y, and z-axis devices 12, 14, and 16, such as the suspension spring 32 and preferably a lead transfer 70 for the fixed electrode 34 of the proof mass 28 for the z-axis device 12. For the x and y-axis devices 14 and 16, the polysilicon layer 30 is used to interconnect different electrodes of these devices 14 and 16. In the preferred implementation shown, portions of the polysilicon layer 30 are used to form lead transfers 72 and 74 that make electrical contact between the inertial devices 14 and 16 and the CMOS wafer 26 in subsequent processing steps. The polysilicon layer 30 is preferably doped using a dopant source such as ion implantation, POCl$_3$ (phosphorus oxy chloride), or a dopant rich glass such as PSG.

FIG. 3h shows the SOI wafer 18 after the definition of metal islands 76 on the suspension spring 32 and lead transfers 70, 72, and 74. The metal islands 76 will subsequently be used to create metal stacks by which the SOI wafer 18 is bonded to the CMOS wafer 26 in a subsequent processing step. Different metal combinations can be used for the metal islands 76 and metal stacks, including gold, nickel, chromium, titanium, etc.

FIG. 3i depicts the SOI wafer 18 after the patterning of the backside protective layer 48 to form a mask for subsequently etching and patterning the handle layer 24 to define electrically isolated islands on the backside of the wafer 18 (FIG. 3l). In FIG. 3j, the refill layer 68 of the SOI wafer 18 has been partially etched to re-expose some of the trenches 66. If the refill layer 68 is LPCVD TEOS, the trenches 66 can be re-opened using an etchant such as buffered hydrofluoric acid. Though not shown, a partial etch of the BOX layer 22 oxide) may also be performed at this time.

FIG. 3k shows the SOI wafer 18 after it has been flipped and bonded to the CMOS wafer 26, using the metal islands 76 on the suspension spring 32 and lead transfers 70, 72, and 74 of the SOI wafer 18 and contact pads 78 on the CMOS wafer 26. The CMOS wafer 26 contains the interface circuit and other functional blocks (not shown). The device layer 20 of the SOI wafer 18 faces the front side of the CMOS wafer 26 after being bonded to the wafer 26 using any suitable low temperature process that is compatible with the CMOS process used to create the interface circuit.

FIG. 3l shows the wafer stack formed by the SOI and CMOS wafers 18 and 26 after an etch through the protective layer 48 to form etch holes 82 and trenches 84, the latter of which define the proof mass 28 and fixed electrode 34 of the z-axis device 12 and the proof masses 36/38 of the x-axis and y-axis devices 14 and 16. In the embodiment shown, the fixed plate 34 is formed by a portion of the handle layer 24 overlying the lead transfer 70, and adjacent an electrically-isolated portion of the handle layer 24 that forms part of the proof mass 28 as a result of being connected through a portion of the BOX layer 22 to that portion of the proof mass 28 defined in the device layer 20 in FIG. 3e. Similarly, electrically-isolated portions of the handle layer 24 defined by the etch holes 82 form part of the proof masses 36 and 38 as a result of being connected through portions of the BOX layer 22 to those portions of the proof masses 36 and 38 defined in the device layer 20 in FIG. 3e. Finally, other electrically-isolated portions of the handle layer 24 can be defined by trenches 84 as stops 80 above the proof masses 36 and 38, as represented in FIG. 1. The etch step can be by DRIE of the handle layer 24, with the BOX layer 22 serving as an etch stop.

A fully differential z-axis device 12 can be formed if a portion of the deposited polysilicon layer 30 is used to form a second fixed plate (electrode) beneath the proof mass 28, so that the proof mass 28 moves between a lower fixed plate (not shown) formed by the polysilicon layer 30 and the upper fixed plate 34 patterned from the handle layer 24. Alternatively, a lower fixed plate can be formed on the CMOS wafer 26, with the gap between the proof mass 28 and lower fixed plate being controlled by the spacing between the SOI and CMOS wafers 18 and 26.

To complete the fabrication of the sensor chip 10 shown in FIG. 1, the proof masses 28, 36, and 38 are released by selectively removing the BOX layer 22 through the etch holes 82 and trenches 84 using an appropriate etching process, which may include wet etching, dry etching, or a combination of the two. A preferred technique is a dry release process using a vapor of hydrofluoric acid to minimize stiction.

In view of the foregoing, it should be noted that variations are possible from that shown and described above. For example, multiple electrically isolated electrodes can be formed for any of the z, x, and y-axis devices 12, 14, and 16 using the etch and isolation processes described in the process flow. These electrically isolated electrodes can be used as independent electrodes at different potentials, for example, to form capacitive bridges, provide separate sensing and feedback capabilities, adjust the sense and/or feedback electrodes, and other capabilities that one skilled in the art would be aware of.

While the invention has been described in terms of a particular embodiment, it is apparent that other forms could be adopted by one skilled in the art. For example, the physical configuration of the sensor chip 10 and its individual devices 12, 14, and 16 could differ from that shown, and materials and processes other than those noted could be use. Therefore, the scope of the invention is to be limited only by the following claims.

The invention claimed is:

1. A process of fabricating a three-axis inertial sensor comprising a z-axis sensing device, an x-axis sensing device, and a y-axis sensing device, the process comprising:

providing a silicon-on-oxide (SOI) wafer comprising a first conductive layer separated from a second conductive layer by an insulative buried oxide (BOX) layer;

fabricating the SOI wafer to partially define in the first conductive layer thereof at least a portion of a proof mass for the z-axis sensing device, at least a portion of a proof mass for the x-axis sensing device, and at least a portion of a proof mass for the y-axis sensing device;

depositing a conductive deposited layer on the SOI wafer and over the first conductive layer;

patterning the deposited layer to define at least one suspension spring for the proof mass of the z-axis sensing device;

bonding the SOI wafer to a substrate so that the first conductive layer of the SOI wafer faces the substrate;

etching the second conductive layer of the SOI wafer to form a fixed electrode of the z-axis sensing device; and then etching portions of the BOX layer to fully release the proof masses and define a capacitive gap between the fixed electrode and the proof mass of the z-axis sensing device.

2. The process according to claim 1, wherein the substrate is a wafer fabricated to comprise interface circuitry for the z, x, and y-axis devices.

3. The process according to claim 2, wherein the interface circuitry comprises a CMOS integrated circuit.

4. The process according to claim 2, wherein the patterning step further comprises defining electrodes from the deposited layer that electrically connect the z, x, and y-axis sensing devices to the interface circuitry of the substrate following the bonding step.

5. The process according to claim 1, further comprising forming a second fixed electrode of the z-axis sensing device on the substrate, wherein the proof mass of the z-axis sensing device moves between the second fixed electrode on the substrate and the fixed electrode etched from the second conductive layer of the SOI wafer.

6. The process according to claim 1, further comprising the step of etching the second conductive layer of the SOI wafer to form at least a second portion of the proof mass for the z-axis sensing device that is connected to the portion of the proof mass defined in the first conductive layer through a portion of the BOX layer.

7. The process according to claim 1, further comprising the step of etching the second conductive layer of the SOI wafer to form at least second portions of the proof masses for the x and y-axis sensing devices that are connected to the portions of the proof masses defined in the first conductive layer through portions of the BOX layer.

8. The process according to claim 1, further comprising the step of etching the first conductive layer of the SOI wafer to form electrodes on the proof masses of the x and y-axis sensing devices that are interdigitated with fixed electrodes to define at least one capacitive gap between the proof mass of the x-axis sensing device and the fixed electrodes thereof and at least one capacitive gap between the proof mass of the y-axis sensing device and the fixed electrodes thereof.

9. The process according to claim 1, further comprising the step of etching the first conductive layer of the SOI wafer to define suspension springs for the proof masses of the x and y-axis sensing devices.

10. The process according to claim 1, wherein the deposited layer is further patterned and etched to form a second fixed electrode of the z-axis sensing device, wherein the proof mass of the z-axis sensing device moves between the second fixed electrode and the fixed electrode etched from the second conductive layer of the SOI wafer.

11. The process according to claim 1, further comprising etching the second conductive layer of the SOI wafer to form at least one stop for at least one of the proof masses of the x and y-axis sensing devices.

12. The process according to claim 1, further comprising at least one of:

etching the second conductive layer of the SOI wafer to form a plurality of electrically-isolated electrodes for at least the z-axis sensing device, and charging at least some of the electrically-isolated electrodes to be at different potentials; and etching the first conductive layer of the SOI wafer to form a plurality of electrically-isolated electrodes for at least one of the x, and y-axis sensing devices, and charging at least some of the electrically-isolated electrodes to be at different potentials.

13. A three-axis inertial sensor having a z-axis sensing device with a proof mass associated therewith, an x-axis sensing device with a proof mass associated therewith, and a y-axis sensing device with a proof mass associated therewith, the sensor comprising:

a silicon-on-oxide (SOI) wafer comprising a first conductive layer separated from a second conductive layer by an insulative buried oxide (BOX) layer;

at least portions of the proof masses for the z-axis, x-axis, and y-axis sensing devices being at least partially defined in the first conductive layer of the SOI wafer;

at least one suspension spring for the proof mass of the z-axis sensing device patterned in a conductive deposited layer on the SOI wafer;

a fixed electrode of the z-axis sensing device defined by a portion of the second conductive layer of the SOI wafer;

a capacitive gap between the fixed electrode and the proof mass of the z-axis sensing device resulting from removal of a portion of the BOX layer; and a substrate bonded to the SOI wafer, the first conductive layer of the SOI wafer facing the substrate.

14. The three-axis inertial sensor according to claim 13, wherein the substrate comprises interface circuitry for the z, x, and y-axis devices.

15. The three-axis inertial sensor according to claim 14, further comprising electrodes defined by portions of the deposited layer and electrically connecting the z, x, and y-axis sensing devices to the interface circuitry of the substrate.

16. The three-axis inertial sensor according to claim 14, wherein the interface circuitry comprises a CMOS integrated circuit.

17. The three-axis inertial sensor according to claim 13, wherein at least a second portion of the proof mass for the z-axis sensing device is defined by a portion of the second conductive layer of the SOI wafer that is connected to the portion of the proof mass defined in the first conductive layer through a portion of the BOX layer.

18. The three-axis inertial sensor according to claim 13, wherein at least second portions of the proof masses for the x and y-axis sensing devices are defined by portions of the second conductive layer of the SOI wafer that are connected to the portions of the proof masses defined in the first conductive layer through portions of the BOX layer.

19. The three-axis inertial sensor according to claim 13, further comprising:

moving electrodes on the proof masses of the x and y-axis sensing devices that are defined by portions of the first conductive layer of the SOI wafer; and fixed electrodes that are defined by portions of the first conductive layer of the SOI wafer, the moving and fixed electrodes being interdigitated to define at least one capacitive gap between the proof mass of the x-axis sensing device and the fixed electrodes thereof and at least one capacitive gap between the proof mass of the y-axis sensing device and the fixed electrodes thereof.

20. The three-axis inertial sensor according to claim 13, further comprising suspension springs for the proof masses of the x and y-axis sensing devices, the suspension springs being defined by portions of the first conductive layer of the SOI wafer.

21. The three-axis inertial sensor according to claim 13, further comprising a second fixed electrode of the z-axis sensing device defined by a portion of deposited layer, wherein the proof mass of the z-axis sensing device moves between the second fixed electrode and the fixed electrode defined by the portion of the second conductive layer of the SOI wafer.

22. The three-axis inertial sensor according to claim 13, further comprising a second fixed electrode of the z-axis sensing device on the substrate, wherein the proof mass of the z-axis sensing device moves between the second fixed electrode on the substrate and the fixed electrode etched from the second conductive layer of the SOI wafer.

23. The three-axis inertial sensor according to claim 13, further comprising at least one stop for at least one of the proof masses of the x and y-axis sensing devices, the at least one stop being defined by the second conductive layer of the SOI wafer.

24. The three-axis inertial sensor according to claim 13, further comprising a plurality of electrically-isolated electrodes for at least one of the z, x, and y-axis sensing devices, the plurality of electrically-isolated electrodes being defined by portions of the second conductive layer of the SOI wafer, at least some of the electrically-isolated electrodes being charged at different potentials.

* * * * *